Figure 1:
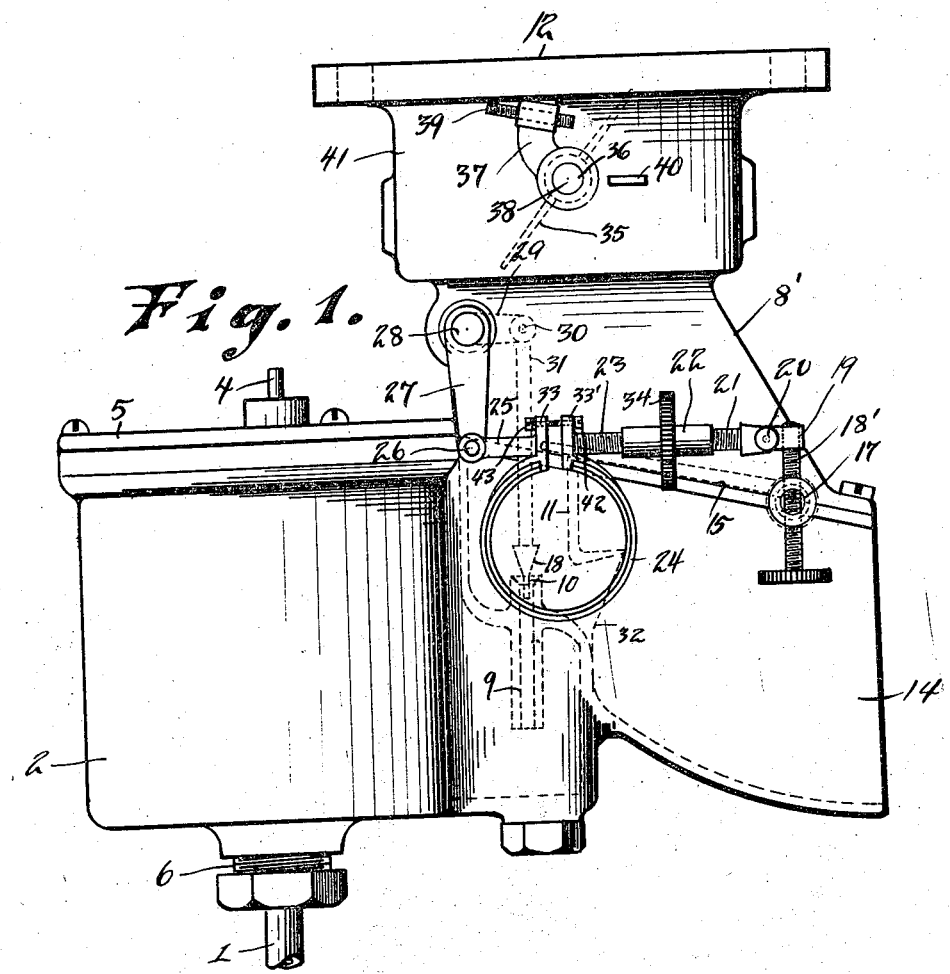

R. JENSEN.
CARBURETER.
APPLICATION FILED AUG. 17, 1912.

1,208,973.

Patented Dec. 19, 1916.
3 SHEETS—SHEET 1.

WITNESSES:
INVENTOR
ATTYS.

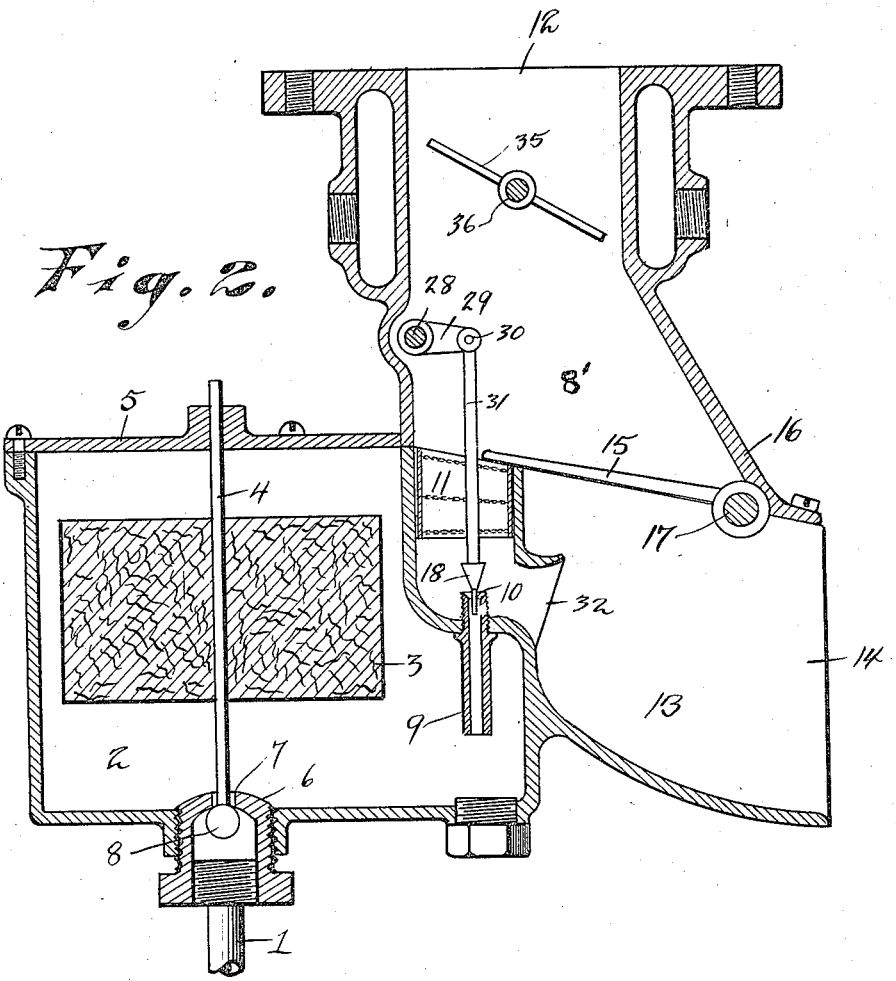

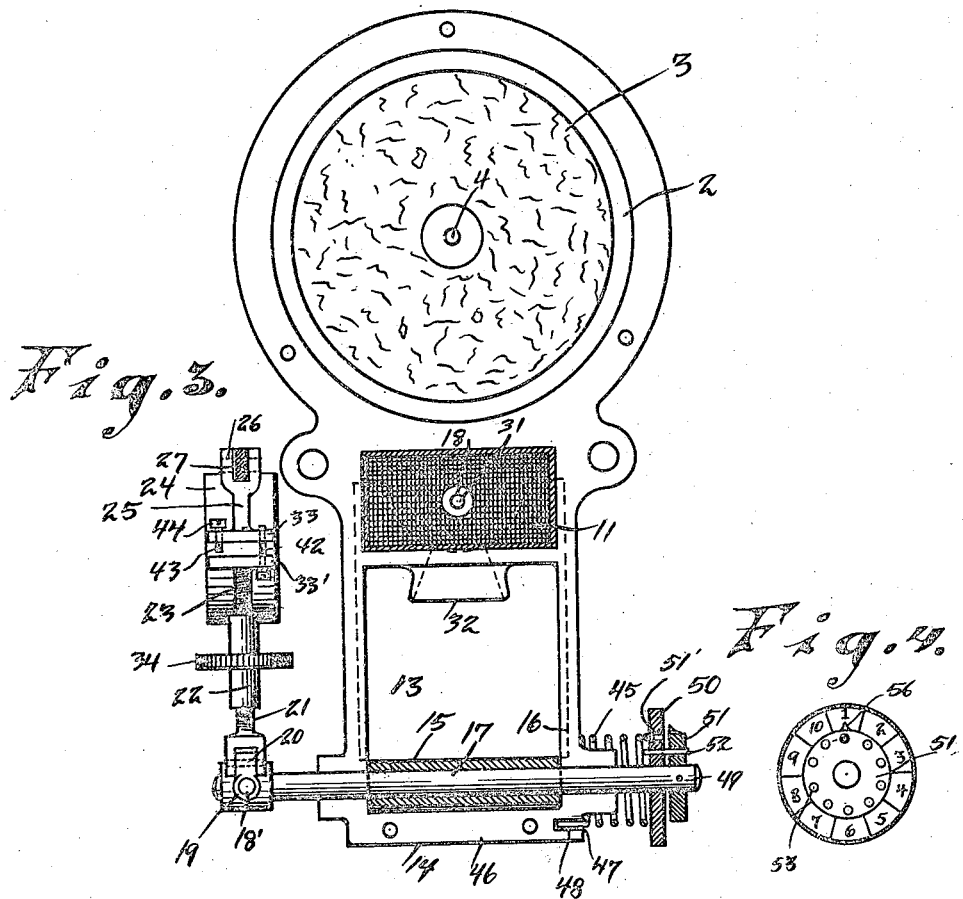

UNITED STATES PATENT OFFICE.

RASMUS JENSEN, OF MILWAUKEE, WISCONSIN, ASSIGNOR TO J-B. CARBURETOR CORPORATION, OF LOS ANGELES, CALIFORNIA, A CORPORATION OF CALIFORNIA.

CARBURETER.

1,208,973.  Specification of Letters Patent.  Patented Dec. 19, 1916.

Application filed August 17, 1912. Serial No. 715,538.

*To all whom it may concern:*

Be it known that I, RASMUS JENSEN, a citizen of the United States, residing at Milwaukee, county of Milwaukee, and State of Wisconsin, have invented new and useful Improvements in Carbureters, of which the following is a specification.

One of the primary objects of my invention is to provide a thermostat for automatically regulating the admission of gasolene to a carbureter.

Experience has demonstrated that a larger quantity of gasolene is required to do a given amount of work on a cold day than on a hot day, owing to the fact that gasolene is more volatile when warm and is therefore more combustible. It follows that a larger quantity of gasolene is required for a given duty under a low temperature than a high temperature, and I have therefore provided a simple thermostatic device for automatically adjusting the gasolene supply valve so as to regulate the supply of gasolene to correspond with variations of temperature.

My invention is further explained by a reference to the accompanying drawings in which—

Figure 1 represents a side view thereof. Fig. 2 is a vertical section of the device shown in Fig. 1. Fig. 3 is an end view part removed in section to show the exterior construction, and Fig. 4 is a detail of the mechanism for adjusting the tension of the air controlling valve.

Like parts are identified by the same reference numerals throughout the several views.

1 represents the inlet duct through which gasolene is led to the float chamber 2 of the carbureter.

3 is a float which is rigidly connected with a float rod 4, and the float rod 4 is slidably supported at its upper end in the cover 5 of the float chamber, and at its lower end in the threaded sleeve 6, and sleeve 6 is provided with a valve seat 7 which is adapted to be closed by the valve 8, and the valve 8 is rigidly affixed to the lower end of the float rod 4. Thus it is obvious that as the float 3 is raised by the buoyancy of the gasolene in the chamber 2, the valve 8 will be brought to its seat, whereby the further admission of gasolene to the chamber 2 is prevented.

8' is the carbureting chamber into which gasolene is led from the chamber 2 through the duct 9, valve port 10, and the duct 11, when it commingles with the air from the exterior and passes from thence to an engine with which the carbureter is connected in the ordinary manner through the outlet duct 12.

13 is an inlet air chamber into which exterior air is admitted through the open side 14.

15 is an air controlling valve. The air controlling valve 15 is pivotally connected with the wall 16 of the carbureter by the hinge rod 17.

18 is a valve for controlling the admission of gasolene from the float chamber 2 to the carbureting chamber 8. The valve 18 is connected with the inlet air controlling valve 15 through the hinge rod 17, adjustable screw threaded rod 18', sleeve 19, pivotal bolt 20, screw threaded rod 21, right and left screw threaded sleeve 22, screw threaded rod 23, thermostat 24, link 25, pivotal bolt 26, crank arm 27, shaft 28, crank arm 29, pivotal bolt 30, and valve rod 31, whereby as the valve 15 is opened and closed by the action of the incoming air, said valve 18 will be simultaneously moved toward and from its seat 10, whereby gasolene will be simultaneously admitted with the air to the vaporizing chamber 8'. It will be understood that the valve 18 is so adjusted as to remain partially open at all times, whereby a sufficient volume of gasolene is permitted to enter the vaporizing chamber when the valve 15 is at rest in its closed position, under which conditions the required volume of air for producing combustion of the small quantity of vaporized gasolene is admitted to the carbureting chamber 8 through the port 32. When, however, the engine with which the carbureter is used is being run at its full or approximately its full capacity, the valve 15 will be automatically opened by the incoming air with each stroke of the piston of the engine, whereby the valve 18 will be actuated as described by the movement of the valve 15.

In view of the fact stated that a larger volume of gasolene is required under a low temperature than a high, I have interposed between the screw threaded rod 23 and the link 25 an ordinary thermostat 24, whereby as the normal temperature is lowered the ends 33 33' of the thermostat are drawn toward each other when the motion of the thermostat communicated therefrom through the link 25, crank arm 27, shaft 28, crank arm 29, pivotal bolt 30, valve rod 31, to said valve 18, whereby said valve 18 is automatically drawn farther from its seat, and whereby a larger volume of gasolene will be admitted to the vaporizing chamber, such quantity corresponds as stated with the normal temperature of the atmosphere.

It will, of course, be understood that as the normal temperature is raised the ends 33 33' of the thermostat will be moved in the opposite direction, when motion will be communicated therefrom through the several parts named to said valve 18, and said valve 18 will be automatically moved toward said seat, whereby a less quantity of gasolene will be admitted to the vaporizing chamber. Thus it follows that by interposing the thermostat between the valves 15 and 18 said valve 18 will be automatically retained nearer to or farther from its seat according to the temperature of the atmosphere, and the supply of gasolene normally permitted to pass such valve will be automatically governed and controlled.

In addition to the thermostat for automatically regulating the adjustment of the valve 18, I have provided means for manually adjusting the mechanism by which such valve is moved, whereby the valve 18 will be caused to open a greater or less distance with a given movement of the valve 15. This desirable end is accomplished by turning the rod 18' forwardly or backwardly through the protruding screw threaded end of the hinge pin 17. It will be understood that the throw or movement of the valve 18 will be increased or diminished according to the distance of the member 19 from the hinge rod 17, and that the member 19 is adapted to be adjusted near to or farther from the hinge pin 17 by turning such screw threaded member 18' forwardly or backwardly through its threaded bearings in said hinge pin. Thus it is obvious that when the screw threaded member 18' is turned forwardly in its threaded bearings the movement of the valve 18 will be increased, and said valve will be more widely opened, when by a reverse movement of the screw threaded member 18' it will be diminished. In addition to the adjustments last described, I have provided additional means for manually adjusting the valve 18 so that it will be retained nearer to or farther from its seat. This end is accomplished by providing the opposing ends of the screw threaded rods 21 and 23 with right and left screw threads and connecting the opposing ends of said rods together by the right and left screw threaded sleeve 22, whereby as said sleeve 22 is revolved in one direction said valve 18 will be moved farther away from its seat, while by reverse movement of said sleeve 22 said valve will be moved toward its seat, whereby the valve 18 may be normally retained at a greater or less distance from its seat.

34 is a radial disk which is rigidly affixed to said sleeve 22, whereby said sleeve may be manually turned toward the right and left on its threaded bearings in the act of adjusting the valve 18.

35 is an ordinary butterfly valve which is pivotally supported at its respective ends from the walls of the outlet port 12 on a valve rod 36.

37 is a bracket which is rigidly affixed to the protruding end 38 of said rod 36, and the outer or free end of said bracket 37 is provided with a screw threaded adjustable rod 39 which is adapted as the valve 35 is closed to contact with the stop 40 formed on the exterior wall 41 of the outlet port, whereby the movement of the valve 35 is controlled and regulated, and whereby such valve may be prevented from being brought in close contact with its seat. To prevent the free opposing ends 33 33' of the thermostat 24 from being sprung toward and from each other as the valve 15 is opened and closed I have connected the ends of such thermostat together upon one side by screw 42, said screw 42 has threaded bearings in one end 33 of said thermostat, while the headed end of said screw is adapted to move freely in an aperture provided therefor in the opposite end 33' of said thermostat, whereby as the valve 15 is moved to its open position by the incoming air the end 33' of said thermostat will be brought into contact with the head of said screw 42, whereby motion will be communicated from one end of said thermostat to the other, and motion will be communicated from said valve 15 to the valve 18 without spreading or springing the opposing ends of the thermostat apart. When, however, said valve 15 is closed said coöperating parts will be moved in the opposite direction, whereby the end 33' of said thermostat will be brought into contact with the opposing end 43 of the screw 44, whereby said valve 18 will be moved in the opposite direction or away from its seat and the strain which would otherwise be communicated to the opposing end of said thermostat as said valves 15 and 18 are opened and closed will be resisted by said screws 42 and 43.

The valve 15 is moved to its closed position both by its gravity and the recoil of the helical spring 45, which spring 45 is connected at one end with the wall 46 of the carbureter by inserting the end 47 in the recess 48 of the wall, while the opposite end of said spring is connected with the protruding end 49 of the valve rod 17 through the radial disk 50, which disk 50 is revolubly supported on the valve rod 17, radial disk 51 which is rigidly affixed to said rod 17 and adjusting the pin 52. Thus it will be obvious that the resistance to the movement of the valve 15 may be increased or diminished by the tension of said spiral spring 45 and the tension of such spring may be increased or diminished by turning the free end of said spring around the supporting valve rod 17. The tension of said spring is thus increased by first pressing the radial disk 50 inward toward the carbureter until it is disengaged from the pin 52, when by turning the disk 50 in one direction the tension of said spring may be increased, while by turning such disk in the opposite direction the tension of said spring will be diminished. The revoluble disk 50 is disconnected from the fixed disk 51 by pushing such disk 50 inwardly until it is disengaged from the pin 52. When this is done the disk 50 is turned toward the right or left until the desired tension given to the spring for controlling the movement of the valve 15. When the required tension has been thus given the spring 45 the disk 50 is moved outwardly until the pin 52 enters one of the annular series of apertures 53 shown in Fig. 4, whereby the spring 45 is retained under any desired tension. As a means of determining the proper adjustment of the disk 50 I preferably provide the same with an annular series of numerals from 1 to 10, indicated in Fig. 4, and I have provided the fixed disk 51 with a V shaped pointer 56. It therefore follows that when the disk 50 is pushed inward and disengaged from the pin 52, it may be turned toward the right or left until the required tension is indicated by the movement of the annular series of numerals past the pointer 56, and when such tension is reached the disk 50 is permitted to move outwardly, when the pin 52 enters an aperture of the series 55 which has been brought opposite to said pin, when the pin 52 will retain the disk 50 and the spring connected with such disk at the desired point of adjustment.

While I have described my device as a means for regulating the admission of gasolene to a carbureter, I wish it to be understood that alcohol or other combustible liquids may be used with my carbureter as a substitute for gasolene.

Having thus described my invention, what I claim as new and desire to secure by Letters Patent is:

1. In a carbureter of the described class the combination of an air controlling valve and liquid controlling valve, means for communicating motion from said air controlling valve to said liquid controlling valve, a thermostat adapted to automatically regulate the movement of said liquid controlling valve and manually actuated means connected with said air controlling valve for increasing or diminishing the throw of said liquid controlling valve.

2. In a carbureter of the described class the combination of an air controlling valve and liquid controlling valve, means for communicating motion from said air controlling valve to said liquid controlling valve, a thermostat adapted to automatically regulate the movement of said liquid controlling valve and means for manually changing the closing point of said liquid controlling valve.

3. In a carbureter of the described class the combination of an air controlling valve and liquid controlling valve, means for communicating motion from said air controlling valve to said liquid controlling valve, a thermostat adapted to automatically regulate the movement of said liquid controlling valve, manually actuated means connected with said air controlling valve for increasing or diminishing the throw of said liquid controlling valve and means for manually changing the closing point of said liquid controlling valve.

4. In a carbureter of the described class the combination of an air controlling valve and liquid controlling valve, means for communicating motion from said air controlling valve to said liquid controlling valve, a thermostat adapted to automatically regulate the movement of said liquid controlling valve, manually actuated means connected with said air controlling valve for increasing or diminishing the throw of said liquid controlling valve, means for manually changing the closing point of said liquid controlling valve, and means for yieldingly resisting the movement of said air controlling valve.

5. In a carbureter of the described class the combination of an air controlling valve and liquid controlling valve, means for communicating motion from said air controlling valve to said liquid controlling valve, a thermostat adapted to automatically regulate the movement of said liquid controlling valve, manually actuated means connected with said air controlling valve for increasing or diminishing the throw of said liquid controlling valve, means for manually changing the closing point of said liquid controlling valve, a helical spring for yieldingly resisting the opening movement of said air controlling valve, and an index dial and pointer for indicating the proper tension of said spring.

6. In a carbureter of the described class the combination of an air controlling valve for controlling the passage of air from an air chamber to a carbureting chamber, a by-pass, or duct, communicating between said chambers whereby air may pass from such air chamber to such carbureting chamber without opening said air controlling valve, a liquid controlling valve and means for communicating motion from said air controlling valve to said liquid controlling valve, and a thermostat adapted to automatically regulate the movement of said liquid controlling valve substantially as specified.

7. In a carbureter the combination with air and oil admission valves, of connections for causing the former to move the latter, said connections including a thermostatic element directly interposed therein between said valves.

In testimony whereof I affix my signature in the presence of two witnesses.

RASMUS JENSEN.

Witnesses:
   JAS. B. ERWIN,
   O. R. ERWIN.